(12) United States Patent
Nagai et al.

(10) Patent No.: US 8,349,751 B2
(45) Date of Patent: Jan. 8, 2013

(54) GLASS COMPOSITION FOR SUBSTRATES

(75) Inventors: Kensuke Nagai, Tokyo (JP); Tetsuya Nakashima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 236 days.

(21) Appl. No.: 12/769,703

(22) Filed: Apr. 29, 2010

(65) Prior Publication Data

US 2010/0210443 A1    Aug. 19, 2010

Related U.S. Application Data

(63) Continuation of application No. PCT/JP2009/053440, filed on Feb. 25, 2009.

(30) Foreign Application Priority Data

Feb. 27, 2008   (JP) ................................. 2008-046356

(51) Int. Cl.
    *C03C 3/087*       (2006.01)
(52) U.S. Cl. .......................................... 501/70; 501/55
(58) Field of Classification Search .................... 501/55, 501/70
    See application file for complete search history.

(56) References Cited

U.S. PATENT DOCUMENTS

| 6,063,718 | A | 5/2000 | El Khiati et al. | |
| 6,297,182 | B1 * | 10/2001 | Maeda et al. | 501/66 |
| 8,071,494 | B2 * | 12/2011 | Nagai et al. | 501/69 |
| 2005/0096209 | A1 * | 5/2005 | Kase et al. | 501/56 |
| 2008/0131628 | A1 * | 6/2008 | Abensour et al. | 428/34 |
| 2009/0239035 | A1 | 9/2009 | Nagai et al. | |
| 2009/0239102 | A1 | 9/2009 | Nagashima et al. | |
| 2009/0253567 | A1 * | 10/2009 | Nagai et al. | 501/70 |
| 2010/0137122 | A1 * | 6/2010 | Nagai et al. | 501/70 |

FOREIGN PATENT DOCUMENTS

| CN | 1300722 A | 6/2001 |
| JP | 03-040933 | 2/1991 |
| JP | 08-165138 | 6/1996 |
| JP | 11-043347 | 2/1999 |
| JP | 2001-58843 | 3/2001 |
| JP | 2004-051473 | 2/2004 |
| WO | WO 2008/004481 A1 | 1/2008 |

OTHER PUBLICATIONS

Supplementary Search Report issued Apr. 11, 2011, in European Patent Application No. 09706784.7-2208/2246310.
U.S. Appl. No. 12/699,944, filed Feb. 4, 2010, Nagai, et al.
U.S. Appl. No. 12/716,467, filed Mar. 3, 2010, Nagashima, et al.
Chinese Office Action issued Jul. 26, 2012, in China Patent Application No. 200980106998.0 (with English Translation).

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

A glass composition for substrates having good polishability while securing characteristics for FPD substrates, especially for PDP substrates, from which a glass substrate having excellent polishing workability and productivity can be obtained, is provided.

A glass composition for substrates, which is characterized by comprising, as represented by mass % based on oxides, from 55 to 75% of $SiO_2$, from 5 to 15% of $Al_2O_3$, from 0 to 4% of MgO, more than 5.5% and at most 12% of CaO, from 5 to 18% of SrO, from 0 to 13% of BaO, from 0.5 to 6% of $ZrO_2$, from 0 to 10% of $Na_2O$, from 0 to 15% of $K_2O$, from 6 to 20% of $Na_2O+K_2O$, from 17 to 25% of MgO+CaO+SrO+BaO, and from 15 to 25% of CaO+SrO, as a glass matrix composition; and having a glass transition point of at least 600° C., an average thermal expansion coefficient of from $75 \times 10^{-7}$ to $90 \times 10^{-7}/°$ C. within a range of from 50 to 350° C., and an abrasion resistance of at least 98.

12 Claims, 1 Drawing Sheet

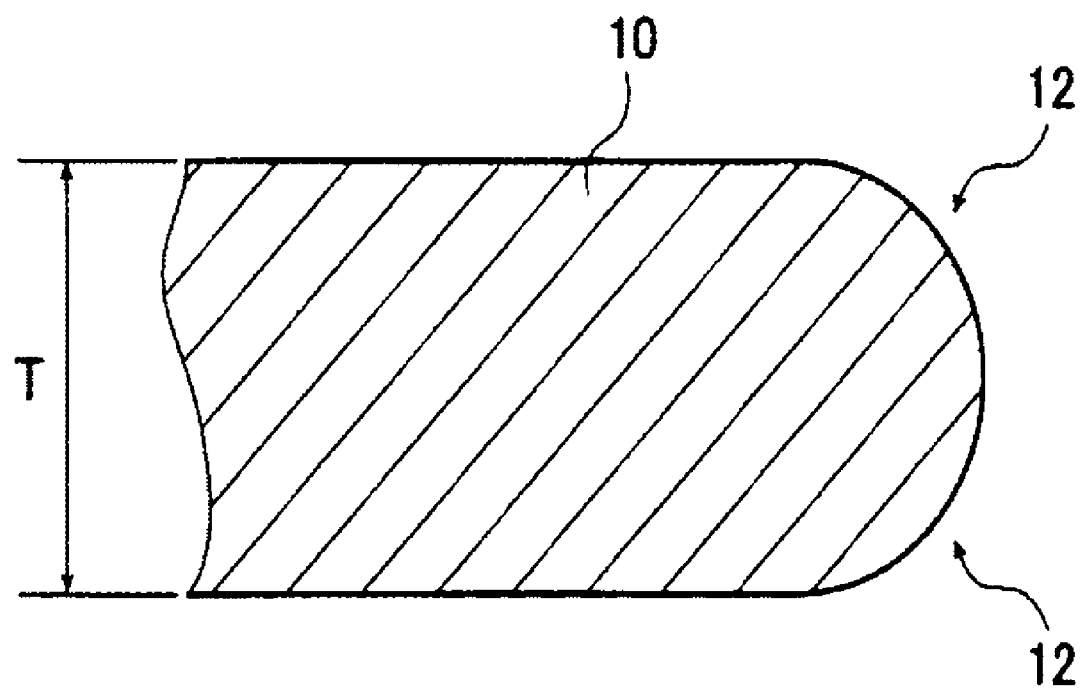

GLASS COMPOSITION FOR SUBSTRATES

TECHNICAL FIELD

The present invention relates to a glass composition for substrates having excellent polishability, which is useful for flat panel display (hereinafter referred to as FPD) substrates, particularly for plasma display panel (hereinafter referred to as PDP) substrates. Further, the present invention relates to a glass composition for substrates of which yellowing is suppressed.

BACKGROUND ART

PDP is usually prepared by baking metal electrodes, an insulating paste, a rib paste, etc. on a substrate glass at a temperature of from about 550 to 600° C., followed by frit-sealing the periphery together with a facing plate. As a substrate glass for PDP, it has been common to employ soda lime silica glass which is widely used in the field of buildings or automobiles.

However, the glass transition point of such soda lime silica glass is from 530 to 560° C. Therefore, if subjected to heat treatment at the above baking temperature, the substrate glass undergoes deformation or shrinkage and thus undergoes a substantial dimensional change, whereby it has been difficult to precisely align the electrode positions with the facing plate.

In order to solve such a problem of thermal deformation or thermal shrinkage of the substrate glass, a glass composition for substrates has been known which has a thermal expansion coefficient close to soda lime silica glass and which has a high glass transition point and a high strain point (Patent Document 1).

Patent Document 1: JP-A-8-165138

DISCLOSURE OF THE INVENTION

Object to be Accomplished by the Invention

The substrate glass for FPD sometimes has its edge portion chamfered (polished) for the purpose of preventing breakage. Or, a plate glass formed by a float process is sometimes polished for the purpose of removing a reduced layer on the surface of the glass. However, conventional glass for substrates is poor in workability during a polishing process, and thus it may easily cause a problem such as decrease in the productivity or increase in the production cost.

On the other hand, a substrate glass having the glass composition adjusted to be excellent only in polishability has difficulty in having characteristics required for a substrate glass for PDP. That is, it is difficult to adjust its characteristics such as a glass transition point, a thermal expansion coefficient, a volume resistivity, a high temperature viscosity and a specific gravity to be within the respective ranges which fulfill the requirements as a substrate glass for PDP.

In order to solve the above-mentioned problems, it is an object of the present invention to provide a glass composition for substrates which has excellent polishability and which can be produced in a high productivity while securing the characteristics for PDP substrates. Further, it is also an object of the present invention to provide a glass composition for substrates of which yellowing is suppressed. Yellowing means a phenomenon such that the color of the surface of a glass substrate changes to yellow when silver electrodes for plasma discharge are formed on the surface of the glass substrate by baking.

Means to Accomplish the Object

In order to accomplish the above object, the present invention provides a glass composition for substrates, which is characterized by comprising, as represented by mass % based on oxides, from 55 to 75% of $SiO_2$, from 5 to 15% of $Al_2O_3$, from 0 to 4% of MgO, more than 5.5% and at most 12% of CaO, from 5 to 18% of SrO, from 0 to 13% of BaO, from 0.5 to 6% of $ZrO_2$, from 0 to 10% of $Na_2O$, from 0 to 15% of $K_2O$, from 6 to 20% of $Na_2O+K_2O$, from 17 to 25% of MgO+CaO+SrO+BaO, and from 15 to 25% of CaO+SrO, as a glass matrix composition; and having a glass transition point of at least 600° C., an average thermal expansion coefficient of from $75\times10^{-7}$ to $90\times10^{-7}$/° C. within a range of from 50 to 350° C., and an abrasion resistance of at least 98.

Effects of the Invention

From the glass composition for substrates of the present invention, a glass for substrates which has excellent polishability and which can be produced in a high productivity and at low cost can be obtained, while securing the characteristics for substrates especially for PDP. Further, a glass for substrates which is less susceptible to yellowing can be obtained.

The glass composition for substrate of the present invention has a high transition point and excellent thermal stability, and is easy to work such as polishing, and therefore it is effectively used also as a glass for solar cell substrates.

BRIEF DESCRIPTION OF THE DRAWINGS

FIG. 1 is a schematic cross-sectional view of a chamfered edge portion of a glass for substrates.

EXPLANATION OF LETTERS OR NUMERALS

10 Substrate glass
12 Chamfered portion
T Thickness of the substrate glass

BEST MODE FOR CARRYING OUT THE INVENTION

Now, the glass composition for substrates of the present invention will be further described.

The glass composition for substrates of the present invention comprises, as represented by mass % based on oxides, from 55 to 75% of $SiO_2$, from 5 to 15% of $Al_2O_3$, from 0 to 4% of MgO, more than 5.5% and at most 12% of CaO, from 5 to 18% of SrO, from 0 to 13% of BaO, from 0.5 to 6% of $ZrO_2$, from 0 to 10% of $Na_2O$, from 0 to 15% of $K_2O$, from 6 to 20% of $Na_2O+K_2O$, from 17 to 25% of MgO+CaO+SrO+BaO, and from 15 to 25% of CaO+SrO, as a glass matrix composition.

The glass composition for substrates of the present invention is defined to have the above composition for the following reasons.

In the following, mass % will simply be represented by % unless otherwise specified.

$SiO_2$ is a component to form the network of the glass, and if it is less than 55%, the heat resistance of the glass tends to be poor. If it exceeds 75%, the thermal expansion coefficient tends to be low, and the high temperature viscosity of the glass tends to increase, whereby the melting property is likely to be poor.

The content of $SiO_2$ is preferably from 55 to 65%, more preferably from 55 to 60%, further preferably from 55 to 57%.

$Al_2O_3$ has an effect to increase the glass transition point and to improve the heat resistance, but if it is less than 5%, such an effect is little. On the other hand, if it exceeds 15%, the high temperature viscosity of the glass tends to increase, whereby the melting property tends to be low.

The content of $Al_2O_3$ is preferably from 5 to 10%, more preferably from 5 to 8%, further preferably from 5 to 7%. To suppress the yellowing, its content is more preferably from 8 to 10%.

MgO has a function to lower the viscosity at the time of melting the glass and to promote the melting when its content is from 0 to 4%. If its content is more than 4%, the polishability of an obtained glass for substrates might be declined.

The content of MgO is preferably from 0 to 3.5%, more preferably from 0 to 3%.

CaO has an effect to improve the polishability of the glass for substrates when it is more than 5.5 and at most 12%. Further, it has an effect to improve the glass transition point of the glass and to increase the thermal expansion coefficient and an effect to lower the high temperature viscosity of the glass and to reduce the specific gravity. If its content is at most 5.5%, the thermal expansion coefficient of the glass tends to be too small, and improvement of the polishability is not expected. On the other hand, if it exceeds 12%, the thermal expansion coefficient tends to be too large, and the devitrification temperature tends to be too high.

The content of CaO is preferably from 6 to 10%, more preferably from 6 to 8%, further preferably from 6 to 7.5%. To suppress the yellowing, it is preferably from 5.8 to 10%, more preferably from 5.8 to 8%, further preferably from 5.8 to 7.5%.

SrO has an effect to improve the polishability of the glass for substrates, to improve the transition point of the glass and to increase the thermal expansion coefficient, in the same manner as CaO, and has an effect to increase the electrical resistance, when it is from 5 to 18%. If its content is less than 5%, the glass transition point tends to be too low, and improvement of the polishability is not expected. On the other hand, if it exceeds 18%, the thermal expansion coefficient of the glass tends to be too large, and the specific gravity tends to be too large.

The content of SrO is preferably from 8 to 15%, more preferably from 8 to 13%, further preferably from 9 to 12%.

BaO has an effect to improve the polishability of the glass for substrates, to improve the glass transition point of the glass and to increase the thermal expansion coefficient, in the same manner as CaO or SrO, and an effect to lower the high temperature viscosity of the glass when it is at most 13%, and thus it may be incorporated. However, if its content exceeds 13%, the thermal expansion coefficient of the glass tends to be too large, and the specific gravity tends to be too large, and therefore it is at most 13%.

The content of BaO is preferably at most 10%, more preferably at most 9%, further preferably at most 8%.

Considering the environmental burden, BaO is preferably not substantially incorporated.

If the total amount of MgO+CaO+SrO+BaO is less than 17%, the high temperature viscosity of the glass tends to be too high, and the glass transition point tends to be too low. On the other hand, if the total amount exceeds 25%, the specific gravity tends to be too large.

Their total amount is preferably from 18 to 25%, more preferably from 19 to 25%.

If the total amount of CaO+SrO is less than 15%, the polishability of the glass for substrates cannot be improved, the high temperature viscosity of the glass tends to be too high, and the glass transition point tends to be too low. On the other hand, if the total amount exceeds 25%, the specific gravity tends to be too large.

Particularly for the improvement of the polishability of the glass for substrates, the content of CaO+SrO is from 15 to 25%, preferably from 15 to 23%, more preferably from 15 to 20%.

At least one of $Na_2O$ and $K_2O$ is essential to have the predefined thermal expansion coefficient of the glass. If their total amount is less than 6%, the thermal expansion coefficient of the glass tends to be too small. On the other hand, if their total amount exceeds 20%, the heat resistance of the glass tends to be low.

Their total amount is preferably from 7 to 17%, more preferably from 7 to 15%. To suppress the yellowing, it is preferably from 7 to 14%, further preferably from 7 to 13%.

In the total amount, the amount of $Na_2O$ is from 0 to 10%, and the amount of $K_2O$ is from 0 to 15%. The amounts of $Na_2O$ and $K_2O$ are preferably from 2 to 10% and from 1 to 13%, respectively, to further improve the polishability of the glass for substrates. To suppress the yellowing, the respective amounts of $Na_2O$ an $K_2O$ are preferably from 2 to 8% and from 1 to 10%, respectively, more preferably from 3 to 8% and from 1.5 to 10%.

On the other hand, $Li_2O$ deteriorates the heat resistance of the glass and should not substantially be contained other than as an unavoidable impurity.

$ZrO_2$ is used to improve the heat resistance and the chemical durability of the glass, but if it is less than 0.5%, its effects are little. On the other hand, if its content exceeds 6%, the devitrification temperature of the glass tends to be too high, and the thermal expansion coefficient tends to be too low.

The content of $ZrO_2$ is preferably from 1 to 5%, more preferably from 1 to 4%, further preferably from 1 to 3.5%.

Therefore, the glass composition for substrates of the present invention preferably comprises, as represented by mass % based on oxides, from 55 to 65% of $SiO_2$, from 5 to 10% of $Al_2O_3$, from 0 to 3.5% of MgO, from 5.8 to 10% of CaO, from 8 to 15% of SrO, from 0 to 10% of BaO, from 1 to 5% of $ZrO_2$, from 2 to 10% of $Na_2O$, from 1 to 13% of $K_2O$, from 7 to 17% of $Na_2O+K_2O$, from 18 to 25% of MgO+CaO+SrO+BaO, and from 15 to 23% of CaO+SrO, as a glass matrix composition.

To suppress the yellowing, the glass composition for substrates preferably comprises, as represented by mass % based on oxides, from 55 to 65% of $SiO_2$, from 8 to 10% of $Al_2O_3$, from 0 to 3.5% of MgO, from 5.8 to 10% of CaO, from 8 to 15% of SrO, from 0 to 10% of BaO, from 1 to 5% of $ZrO_2$, from 2 to 8% of $Na_2O$, from 1 to 10% of $K_2O$, from 7 to 14% of $Na_2O+K_2O$, from 18 to 25% of MgO+CaO+SrO+BaO, and from 15 to 23% of CaO+SrO, as a glass matrix composition, and further contains from 0.06 to 0.15% of $Fe_2O_3$ as an additive.

Further, in order to improve the melting property, $B_2O_3$ may be incorporated. However, if it is excessively incorporated, the thermal expansion coefficient of the substrate glass tends to be too low, and therefore, it is preferably less than 1.5%. For the glass composition for substrates of the present invention, it is preferred that $B_2O_3$ is not substantially incorporated.

At the time of producing the glass composition for substrates of the present invention, $SO_3$ is preferably added as a fining agent. As a $SO_3$ source, a sulfate such as potassium sulfate ($K_2SO_4$), sodium sulfate ($Na_2SO_4$) or calcium sulfate ($CaSO_4$) is preferably put into the glass raw material, and in the glass composition for substrates after the production, a part of $SO_3$ added as a fining agent will remain in some cases. If such a fining agent is put into the glass material in such an amount that the residual amount in the glass composition for substrates after the production would exceed 0.6%, glass undergoes reboiling during the production, whereby gas bubbles tend to remain in the glass.

Further, when $SO_3$ is used as a fining agent, if the amount of its addition exceeds 10 parts by mass per 100 parts by mass of the above glass matrix composition raw material, it will be separated from the glass melt during the melting and will remain as dissolved. On the other hand, if it is less than 0.5 parts by mass, the fining effect tends to be poor. Therefore, it is preferably added in an amount of from 0.5 to 10 parts by mass, more preferably from 0.5 to 8 parts by mass, further preferably from 0.5 to 4 parts by mass, particularly preferably from 0.7 to 2 parts by mass (hereinafter, "parts by mass" for an amount is based on 100 parts by mass of the glass matrix composition raw material).

In such a case, its residual amount (content) in the glass composition for substrates is, as represented by mass %, preferably from 0.001 to 0.6%, more preferably from 0.002 to 0.5%, further preferably from 0.005 to 0.4%, particularly preferably from 0.01 to 0.4%, as calculated as $SO_3$.

To the glass composition for substrates of the present invention, in addition to the above components, $SnO_2$, $As_2O_3$, $Sb_2O_3$, $P_2O_5$, F and Cl are adjusted to be incorporated preferably in a total amount of at most 2 mass %, more preferably at most 1.5 mass %, based on the glass matrix composition material, in order to improve the melting property, clarification property or moldability of the glass.

Further, in order to improve the durability of the glass composition for substrates, $La_2O_3$, $TiO_2$, $SnO_2$ and ZnO may be incorporated as additives in a total amount of at most 5 mass %, based on the glass matrix composition material.

Further, in order to adjust the color of the glass composition for substrates, coloring agents such as $Fe_2O_3$, CoO, NiO, $Nd_2O_3$, etc. may be incorporated. Such coloring agents may be incorporated in a total amount of at most 3 mass %, preferably at most 1 mass %, based on the glass matrix composition material.

Further, from the viewpoint of the improvement of the melting property, $Fe_2O_3$ is preferably contained as an additive in an amount of at least 0.06%. Further, to suppress the glass yellowing, $Fe_2O_3$ is preferably contained in an amount of at most 0.15%. $Fe_2O_3$ is preferably contained in an amount of from 0.06 to 0.14%, more preferably from 0.07 to 0.13%, further preferably from 0.08 to 0.12%.

The glass substrate of the glass composition of the present invention preferably has an average $Fe^{2+}$ content of at most 0.0725%, as calculated as $Fe_2O_3$, in the surface layer within a depth of 10 μm from the surface of the glass substrate to which side silver electrodes are formed, at the time of forming silver electrodes on the surface of the glass substrates.

The glass composition for substrates of the present invention preferably has a lower high temperature viscosity than conventional PDP substrate glass. Specifically, the temperature $T_2$ of the glass melt corresponding to the viscosity of $10^2$ dPa·s is preferably at most 1,570° C.

The viscosity of $10^2$ dPa·s is a reference viscosity showing that the viscosity of the glass melt is sufficiently low. Accordingly, the temperature $T_2$ at which the viscosity of the glass melt becomes $10^2$ dPa·s is a reference temperature for the glass melt.

In the case of the glass composition for substrates of the present invention, the melting step can be carried out at a low temperature. As a result, stabilized production of glass becomes possible. Further, the useful life of the melting tank will be prolonged as the temperature of the melting tank during the melting step becomes low. The glass production cost will decrease as the amount of fuel to be used for the melting step will be reduced.

$T_2$ is preferably at most 1,560° C., more preferably at most 1,550° C., further preferably at most 1,540° C., particularly preferably at most 1,500° C.

The glass composition for substrates of the present invention is preferably such that that the temperature $T_4$ of the glass melt corresponding to a viscosity of $10^4$ dPa·s is at most 1,200° C.

The viscosity of $10^4$ dPa·s is a reference viscosity for float forming of the glass. Accordingly, the temperature $T_4$ at which the viscosity of the glass melt becomes $10^4$ dPa·s is also a reference temperature of the glass melt in the float forming step.

In the case of the glass composition for substrates of the present invention, the float forming step can be carried out at a temperature lower than ever before. As a result, stabilized forming of glass becomes possible. Further, the useful life of the float bath will be prolonged. Further, the production cost of substrate glass decreases as the fuel required for heating the float bath is reduced. Further, the temperature of the glass ribbon withdrawn from the float bath will be low, whereby an energy required for the annealing step which is carried out subsequent to the float forming, will be reduced.

The glass composition for substrates of the present invention has an average thermal expansion coefficient of from $75 \times 10^{-7}$ to $90 \times 10^{-7}$/° C. within a range of from 50 to 350° C. In a case where the glass composition for substrates of the present invention is used for PDP substrates, it is necessary to use one which agrees with the thermal expansion coefficient of the glass, as a frit material or a paste material to be used for the production of PDP. In the temperature range in the baking step carried out for the production of PDP (from 50 to 350° C.), it is very difficult to select one, of which the thermal expansion coefficient is outside the above-mentioned range.

The glass composition for substrates of the present invention more preferably has a thermal expansion coefficient within a range of from $80 \times 10^{-7}$ to $90 \times 10^{-7}$/° C.

The glass composition for substrates of the present invention preferably has a specific gravity of at most 2.9. If the specific gravity exceeds 2.9, the glass composition for the substrates becomes heavy, such being undesirable from the viewpoint of the handling, particularly the transportation. The specific gravity of the glass composition for substrates being at most 2.9 is a particularly important characteristic for a large size substrate.

The glass composition for substrates of the present invention preferably has a specific gravity of at most 2.8, more preferably at most 2.75.

The glass composition for substrates of the present invention has a glass transition point (Tg) of at least 600° C. If the glass transition point is lower than 600° C., shrinkage of the glass by thermal treatment cannot sufficiently be made small in a case where a large size PDP so-called 40 inches is to be produced.

The glass composition for substrates of the present invention more preferably has a Tg of at least 615° C., further preferably at least 630° C., further preferably at least 640° C., particularly preferably at least 650° C.

The glass composition for substrates of the present invention preferably has a volume resistivity of at least $10^{11}$ Ω·cm at 150° C. At the time of producing PDP, silver electrodes are formed on the surface of a substrate glass. When an electric current is conducted to the silver electrodes, in order to prevent a part of the conducted electric current from flowing in the glass in the vicinity of the silver electrodes, it is preferred that the glass composition for substrates is excellent in the insulating property. When the volume resistivity is at least $10^{11}\Omega\cdot cm$ at 150° C., the insulating property is excellent, and even when PDP is large sized or highly densified, there will be no such a possibility that when an electric current is conducted to silver electrodes formed on the substrate glass, a part of the conducted electric current will flow in the glass in the vicinity of the silver electrodes.

Usually if the composition of the glass composition for substrates is selected by paying attention only to lower the high temperature viscosity, it is difficult to bring the volume resistivity at 150° C. to a level of at least $10^{11}\Omega\cdot cm$. In the case of the glass composition for substrates of the present invention, it is possible to lower the high temperature viscosity of the glass while maintaining the volume resistivity of the glass at 150° C. at a level of at least $10^{11}\Omega\cdot cm$.

With the substrate glass of the present invention, the volume resistivity of the glass at 150° C. is preferably at least $2\times10^{11}\Omega\cdot cm$, more preferably at least $5\times10^{11}\Omega\cdot cm$.

The glass composition for substrates of the present invention has an abrasion resistance (FA), which is an index for polishability, of at least 98. Accordingly, it has high workability of chamfering (polishing of the edge portion) for the purpose of preventing breakage of the glass such as cracking or chipping, and its productivity can be improved and its production cost can be reduced.

Further, the chamfering quality is improved, and thus it contributes to the improvement of the yield due to the reduction of the breakage rate. And, it has high workability of polishing of the glass surface for the purpose of e.g. preventing the coloring of silver at the time of forming electrodes on the glass surface. Accordingly, the productivity can be improved, and the production cost can be reduced.

The substrate glass of the present invention preferably has an abrasion resistance (FA) of at least 100, more preferably at least 105, particularly preferably from 105 to 150.

The abrasion resistance means a value measured as follows.

A sample having a measured area of 9 cm², of which the mass is preliminary measured, is hold on a surface of a disk-shaped flat plate made of cast iron and 80 mm away from the center of the plate. While the plate rotates at 60 rpm maintaining its horizontal attitude, a lapping fluid obtained by adding an alumina abrasive grain having an average particle size of 20 μm to 20 ml of water is uniformly supplied to the surface of the plate for 5 minutes. Next, the sample is lapped by applying a load of 9.807 N, and then its mass is measured. Abrasion mass m is obtained from the mass difference between before and after the lapping.

Next, the same operation as above is applied to a standard sample (BSC7), designated by Japan Optical Glass Industrial Association, and its abrasion mass $m_0$ is obtained in the same manner as above.

Abrasion resistance (FA) is obtained from the following formula:

$$FA=(m/d)/(m_0/d_0)\times 100$$

wherein d is a specific gravity of the sample, and $d_0$ is the specific gravity of the standard sample (BSC7). Here, a specific gravity means a value measured by Archimedes method using pure water.

Next, the above chamfering (polishing) for the purpose of e.g. preventing breakage will be described.

In the present invention, chamfering means to remove a corner to make an arc-shaped chamfered portion 12, e.g. as illustrated in FIG. 1, by polishing the edge portion generated when the substrate glass is cut into a desired size. However, the shape of the chamfered portion is not limited to arc-shape, and it may be another shape.

A method for chamfering is not specifically limited. For example, as a conventional known method, the edge portion of a plate glass can be chamfered by using a rotating wheel with abrasive grains, which is equipped with an abrasive grain portion on the rotating surface.

Next, the polishing of the surface of the glass for substrates for the purpose of e.g. preventing the coloring of silver, as described above, will be described.

When a silver paste is baked on the surface of a substrate glass having a reduced layer at its surface to form silver electrodes, the reduced layer is sometimes removed by polishing since the surface is colored in some cases.

The polishing method is not specifically limited. For example, as a conventional known method, a surface of a substrates glass may be polished by means of an Oscar polishing machine using cerium oxide etc. as a polishing agent.

On the other hand, relating to the polishing, a plate glass can be ground by using a core drill having abrasive grains, which is equipped with an abrasive grain portion at the end of the rotating core to easily make a hole.

The glass composition for substrates of the present invention preferably has a crack depth, as an another index of the polishability, of at least 37 μm when a Vickers indenter is indented with a load of 200 g. Also in this case, chamfering, polishing and hole making are easy. However, the abrasion resistance is more suitable as an index than the crack depth because it is based on polishing.

As to the crack depth, the indentation by the Vickers indenter is cut vertically, and the vertical crack depth is measured at the end surface.

The glass for substrates of the present invention preferably has the crack depth of from 39 to 100 μm.

Further, to suppress the yellowing, the glass for substrates of the present invention preferably has an yellowing index value b* of at most 4, more preferably at most 3.5, particularly preferably from 0 to 3, on the glass surface after a silver paste is applied to the glass surface, baked and removed.

From the glass composition for substrates of the present invention, a glass for substrates can be produced, for example, by the following method. That is, raw materials of the components which are normally used are prepared to be a desired composition. They are put into a melting furnace, heated and melted at from 1,200 to 1,400° C., and subjected to fining at from 1,400 to 1,700° C. Then the molten glass is formed into a plate having a predetermined thickness by a float process and it is cut after annealed to obtain a transparent glass substrate.

EXAMPLES

Now, the present invention will be further described with reference to Examples.

The glass compositions in Examples 1 to 5 (Working Examples) and Examples 6 to 8 (Comparative Examples) are shown in Table 1, and those in Examples 9 to 13 (Working Examples) are shown in Table 2.

A material was prepared so that the matrix composition ($SiO_2$ to $Zr_2O$) would be as shown in Tables 1 and 2 and the additive shown in Table 2 would be contained. 0.8 Parts by mass of a sulfate salt, as calculated as $SO_3$, was added to 100 parts by mass of the material to obtain a glass material, and the glass material was heated and melted at from 1,500 to 1,600° C. for 4 hours by using a platinum crucible. For the melting, a platinum stirrer was inserted, and stirring was carried out for 2 hours to homogenize the glass. Then, the glass melt was cast and annealed, followed by polishing to obtain a plate having a thickness of 2.8 mm.

With respect to the glass thus obtained, the glass composition (mass %), the glass transition point Tg (° C.), the average thermal expansion coefficient $\alpha_{50-350}$ ($10^{-7}/°$ C.) at from 50 to 350° C., the volume resistivity $\rho$ ($\Omega\cdot$cm) at 15° C., $T_2$ (° C.), $T_4$ (° C.), the specific gravity (g/cm$^3$), the abrasion resistance and the crack depth (μm) were measured. The results are shown in Tables 1 and 2. The residual amount of $SO_3$ in the glass was from 0.05 to 0.3 mass %. In the Tables, numerals in brackets are calculated values.

The average thermal expansion coefficient at from 50 to 350° C. was measured by using a differential thermal dilatometer (TMA) and obtained in accordance with JIS R3102 (1995).

The glass transition point was measured by using TMA and obtained in accordance with JIS R3103-3 (2001).

The volume resistivity was calculated from a measured value of a current which passes through the glass when a voltage of 100 V was applied to the electrodes using three-terminal method.

With regard to $T_2$ and $T_4$, the viscosity of a composition which was similar to each of Examples 1 to 13 was measured by using a rotating viscometer, and the weighted averages of $T_2$, at which the viscosity of each glass of Examples 1 to 13 became $10^2$ dPa·s, and $T_4$, at which it became $10^4$ dPa·s, were calculated.

The glass transition point was measured as follows. The glass was maintained at a temperature of annealing point for 30 minutes and then annealed at a cooling rate of 60° C./min. Then, with respect to this annealed glass, a thermal expansion coefficient curve to a temperature of from room temperature to the deformation point was obtained by using a differential thermal dilatometer. Before and after the first bent portion of this curve, tangent lines were drawn, and the temperature corresponding to the intersection of the tangent lines was taken as a glass transition point.

The value b* was obtained as follows. The above obtained glass was melted, cast to be a plate and annealed, and the both surfaces were subjected to mirror polishing to obtain a plate glass having a thickness of 2.8 mm. In order to form a reduction reaction layer on the surface of the plate glass, it was heated in an atmosphere of 10 vol % of hydrogen and 90 vol % of nitrogen in an electric furnace at 750° C. for 5 hours. On the surface of the plate glass having a reduction reaction layer formed, a silver paste (Dotite, manufactured by DuPont) was applied, the temperature was raised at a rate of 200° C./hour, it was baked at 560° C. for 1 hour, the temperature was reduced to room temperature at a rate of 60° C./hour, the silver paste was removed by using 10% nitric acid, and then its visible light transmission was measured. As an index for the yellowing on and around the lower face of the silver electrodes, the color difference value b* of the L*a*b* color coordinates of a light source C was obtained from this value in accordance with JIS-Z8729.

TABLE 1

|  |  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| SiO$_2$ | [mass %] | 58.7 | 56.5 | 56.0 | 56.0 | 60.0 | 57.7 | 60.2 | 60.3 |
| Al$_2$O$_3$ | [mass %] | 7.0 | 6.8 | 6.0 | 6.0 | 6.0 | 6.9 | 8.0 | 7.2 |
| MgO | [mass %] | 0.6 | 0.1 | 2.0 | 2.0 | 2.0 | 2.0 | 0.0 | 3.1 |
| CaO | [mass %] | 7.4 | 6.2 | 6.1 | 6.1 | 6.1 | 5.0 | 10.0 | 5.2 |
| SrO | [mass %] | 10.7 | 8.8 | 9.1 | 9.9 | 9.9 | 7.1 | 3.0 | 8.8 |
| BaO | [mass %] | 2.0 | 8.6 | 7.3 | 5.0 | 5.0 | 8.0 | 6.6 | 0.0 |
| Na$_2$O | [mass %] | 4.4 | 4.2 | 6.7 | 6.7 | 6.0 | 4.3 | 6.0 | 4.5 |
| K$_2$O | [mass %] | 6.1 | 5.8 | 1.8 | 5.9 | 2.4 | 6.0 | 4.0 | 7.7 |
| ZrO$_2$ | [mass %] | 3.1 | 3.0 | 5.0 | 2.4 | 2.6 | 3.0 | 2.2 | 3.2 |
| Na$_2$O + K$_2$O | [mass %] | 10.5 | 10.0 | 8.5 | 12.6 | 8.4 | 10.3 | 10.0 | 12.2 |
| MgO + CaO + SrO + BaO | [mass %] | 20.7 | 23.7 | 24.5 | 23.0 | 23.0 | 22.1 | 19.6 | 17.1 |
| CaO + SrO | [mass %] | 18.1 | 15.0 | 15.2 | 16.0 | 16.0 | 12.1 | 13.0 | 14.0 |
| Transition point [° C.] | [° C.] | 647 | 634 | 631 | 635 | 623 | 625 | 626 | 638 |
| Average thermal expansion coefficient | [×10$^{-7}$/° C.] | 84 | 86 | 79 | 79 | 79 | 83 | 84 | 84 |
| $\rho$ | [$\Omega\cdot$cm] | $10^{12.2}$ | $10^{12.6}$ | $10^{11.5}$ | $10^{11.5}$ | $10^{11.5}$ | $10^{12.0}$ | $10^{11.2}$ | $10^{11.7}$ |
| T$_2$ | [° C.] | 1557 | 1565 | 1482 | 1487 | 1532 | 1561 | 1503 | 1548 |
| T$_4$ | [° C.] | 1162 | 1142 | 1076 | 1085 | 1111 | 1141 | 1145 | 1188 |
| Specific gravity | [g/cm$^3$] | 2.74 | 2.83 | 2.86 | 2.84 | 2.77 | 2.77 | 2.69 | 2.66 |
| Abrasion resistance | — | 113 | 113 | 106 | 107 | 99 | 96 | 89 | 96 |
| Crack depth | [μm] | 57 | 70 | 37 | 56 | 39 | 34 | 35 | 35 |
| b* | — | (4.8) | (14.0) | (14.3) | (11.1) | (11.9) | 6 | (15.7) | (5.4) |

TABLE 2

|  |  | Ex. 9 | Ex. 10 | Ex. 11 | Ex. 12 | Ex. 13 |
| --- | --- | --- | --- | --- | --- | --- |
| SiO$_2$ | [mass %] | 56.5 | 56.1 | 55.5 | 55.6 | 55.4 |
| Al$_2$O$_3$ | [mass %] | 8.7 | 9.0 | 9.1 | 9.4 | 9.6 |
| MgO | [mass %] | 2.3 | 2.3 | 2.3 | 2.1 | 2.3 |
| CaO | [mass %] | 6.5 | 6.4 | 5.9 | 6.4 | 5.9 |
| SrO | [mass %] | 10.7 | 11.0 | 11.0 | 11.0 | 11.0 |
| BaO | [mass %] | 2.2 | 2.2 | 3.6 | 2.2 | 3.3 |
| Na$_2$O | [mass %] | 3.7 | 3.3 | 2.9 | 3.3 | 2.9 |
| K$_2$O | [mass %] | 6.7 | 7.3 | 7.6 | 7.6 | 7.7 |
| ZrO$_2$ | [mass %] | 2.6 | 2.3 | 2.0 | 2.3 | 1.8 |

TABLE 2-continued

|  |  | Ex. 9 | Ex. 10 | Ex. 11 | Ex. 12 | Ex. 13 |
|---|---|---|---|---|---|---|
| $Fe_2O_3$ | [mass %] | 0.08 | 0.08 | 0.08 | 0.08 | 0.08 |
| $Na_2O + K_2O$ | [mass %] | 10.4 | 10.6 | 10.5 | 10.9 | 10.6 |
| $MgO + CaO + SrO + BaO$ | [mass %] | 21.7 | 21.9 | 22.8 | 21.7 | 22.5 |
| $CaO + SrO$ | [mass %] | 17.2 | 17.4 | 16.9 | 17.4 | 16.9 |
| Transition point [° C.] | [° C.] | 652 | 652 | (653) | 651 | 655 |
| Average thermal expansion coefficient | [×10$^{-7}$/° C.] | 83 | 83 | 83 | 84 | 83 |
| ρ | [Ω·cm] | $10^{12.3}$ | $10^{12.3}$ | ($10^{12.4}$) | ($10^{12.2}$) | ($10^{12.3}$) |
| $T_2$ | [° C.] | 1521 | 1525 | (1528) | (1531) | (1535) |
| $T_4$ | [° C.] | 1138 | 1141 | (1142) | (1145) | (1146) |
| Specific gravity | [g/cm$^3$] | 2.74 | 2.74 | (2.76) | (2.75) | (2.76) |
| Abrasion resistance | — | 122 | 123 | 98≦ | 98≦ | 98≦ |
| Crack depth | [μm] |  |  |  |  |  |
| b* | — | 3.3 | 1.8 | (1.8) | (1.8) | (1.8) |

As is apparent from Tables 1 to 2, the glass in each Working Example (Examples 1 to 5 and 9 to 13) has an abrasion resistance of at least 98, and it is excellent in the polishability.

Further, it has a glass transition point of at least 600° C., a thermal expansion coefficient of from 75×10$^{-7}$/° C. to 90× 10$^{-7}$/° C. and a volume resistivity ρ of at least 10$^{11}$Ω·cm, and it is suitable for a substrate glass for PDP.

By contrast, in each Examples 6 and 8, CaO is at most 5.5%, and further, CaO+SrO is less than 15%, and thus the glass has a low abrasion resistance.

In Example 7, SrO is less than 5%, and further, CaO+SrO is less than 15%, and thus the glass has a low abrasion resistance.

Therefore, The productivity of glasses in Examples 6 to 8 is low.

Further, the glass in each Examples 9 to 13 has a value b* of at most 4, and it is confirmed that the yellowing is less likely to occur.

A material is prepared to have the glass composition of the present invention, and it was melted and formed into a plate glass by the float method. After it was cut into a predefined size, the edge portion of the glass is chamfered for the purpose of e.g. preventing breakage. Further, the surface of the glass is polished for the purpose of removing the reduced layer on the surface of the glass as necessary.

With regard to the glass for substrates having the composition of the present invention, the edge portion of the glass can be chamfered (polished) efficiently, and the surface of the glass can be polished efficiently. As a result, it is excellent in its productivity, and a desired glass for substrates can be produced at low cost.

INDUSTRIAL APPLICABILITY

The glass composition for substrates of the present invention is useful for FPD substrates, particularly for PDP substrates. Further, the glass composition for substrates of the present invention may be used also for solar cell substrates or magnetic disk substrates.

The entire disclosure of Japanese Patent Application No. 2008-046356 filed on Feb. 27, 2008 including specification, claims, drawings and summary is incorporated herein by reference in its entirety.

What is claimed is:

1. A glass composition, comprising, by mass % based on oxides:
   from 55 to 75% of $SiO_2$,
   from 5 to 15% of $Al_2O_3$,
   from 0 to 4% of MgO,
   more than 5.5% and at most 12% of CaO,
   from 5 to 18% of SrO,
   from 0 to 13% of BaO,
   from 0.5 to 6% of $ZrO_2$,
   from 0 to 10% of $Na_2O$,
   from 0 to 15% of $K_2O$,
   from 6 to 20% of $Na_2O+K_2O$,
   from 17 to 25% of $MgO+CaO+SrO+BaO$, and
   from 15 to 25% of CaO+SrO,
   wherein the composition is a glass matrix composition;
   the composition is suitable for a substrate; and
   the composition has a glass transition point of at least 600° C., an average thermal expansion coefficient of from 75×10$^{-7}$ to 90×10$^{-7}$/° C. within a range of from 50 to 350° C., and an abrasion resistance of at least 98.

2. The composition of claim 1, comprising, by mass % based on oxides:
   from 55 to 65% of $SiO_2$,
   from 5 to 10% of $Al_2O_3$,
   from 0 to 3.5% of MgO,
   from 5.8 to 10% of CaO,
   from 8 to 15% of SrO,
   from 0 to 10% of BaO,
   from 1 to 5% of $ZrO_2$,
   from 2 to 10% of $Na_2O$,
   from 1 to 13% of $K_2O$,
   from 7 to 17% of $Na_2O+K_2O$,
   from 18 to 25% of $MgO+CaO+SrO+BaO$, and
   from 15 to 23% of CaO+SrO,
   wherein the composition is a glass matrix composition.

3. The composition of claim 1, comprising, by mass % based on oxides:
   from 55 to 65% of $SiO_2$,
   from 8 to 10% of $Al_2O_3$,
   from 0 to 3.5% of MgO,
   from 5.8 to 10% of CaO,
   from 8 to 15% of SrO,
   from 0 to 10% of BaO,
   from 1 to 5% of $ZrO_2$,
   from 2 to 8% of $Na_2O$,
   from 1 to 10% of $K_2O$,
   from 7 to 14% of $Na_2O+K_2O$,
   from 18 to 25% of $MgO+CaO+SrO+BaO$, and
   from 15 to 23% of CaO+SrO,
   wherein the composition is a glass matrix composition;
   the composition further comprises from 0.06 to 0.15% of $Fe_2O_3$ as an additive; and
   the composition has an yellowing index value b* of at most 4 on a glass surface after a silver paste is applied to the glass surface, baked and removed.

4. The composition of claim 1, which has a volume resistivity of at least $10^{11} \Omega \cdot cm$ at 150° C.

5. The composition of claim 1, wherein a BaO content is greater than 0.

6. The composition of claim 1, wherein a BaO content is 0.

7. The composition of claim 1, wherein a $Li_2O$ content is 0.

8. The composition of claim 1, further comprising less than 1.5% $B_2O_3$, by mass % based on oxides.

9. The composition of claim 1, wherein a content of $SO_3$ is less than or equal to 0.6% by mass based on oxides.

10. The composition of claim 1, wherein a total content of $SnO_2$, $As_2O_3$, $Sb_2O_3$, $P_2O_5$, F, and Cl is at most 2 mass %.

11. The composition of claim 1, further comprising $La_2O_3$, $TiO_2$, $SnO_2$, ZnO, or a combination thereof, in a total content of at most 5 mass %, based on a mass of the glass matrix composition.

12. The composition of claim 1, further comprising $Fe_2O_3$, CoO, NiO, $Nd_2O_3$, or a combination thereof, in a total amount of at most 3 mass %, based on a mass of the glass matrix composition.

* * * * *